G. SCHMIDT.
VALVE.
APPLICATION FILED DEC. 19, 1913.

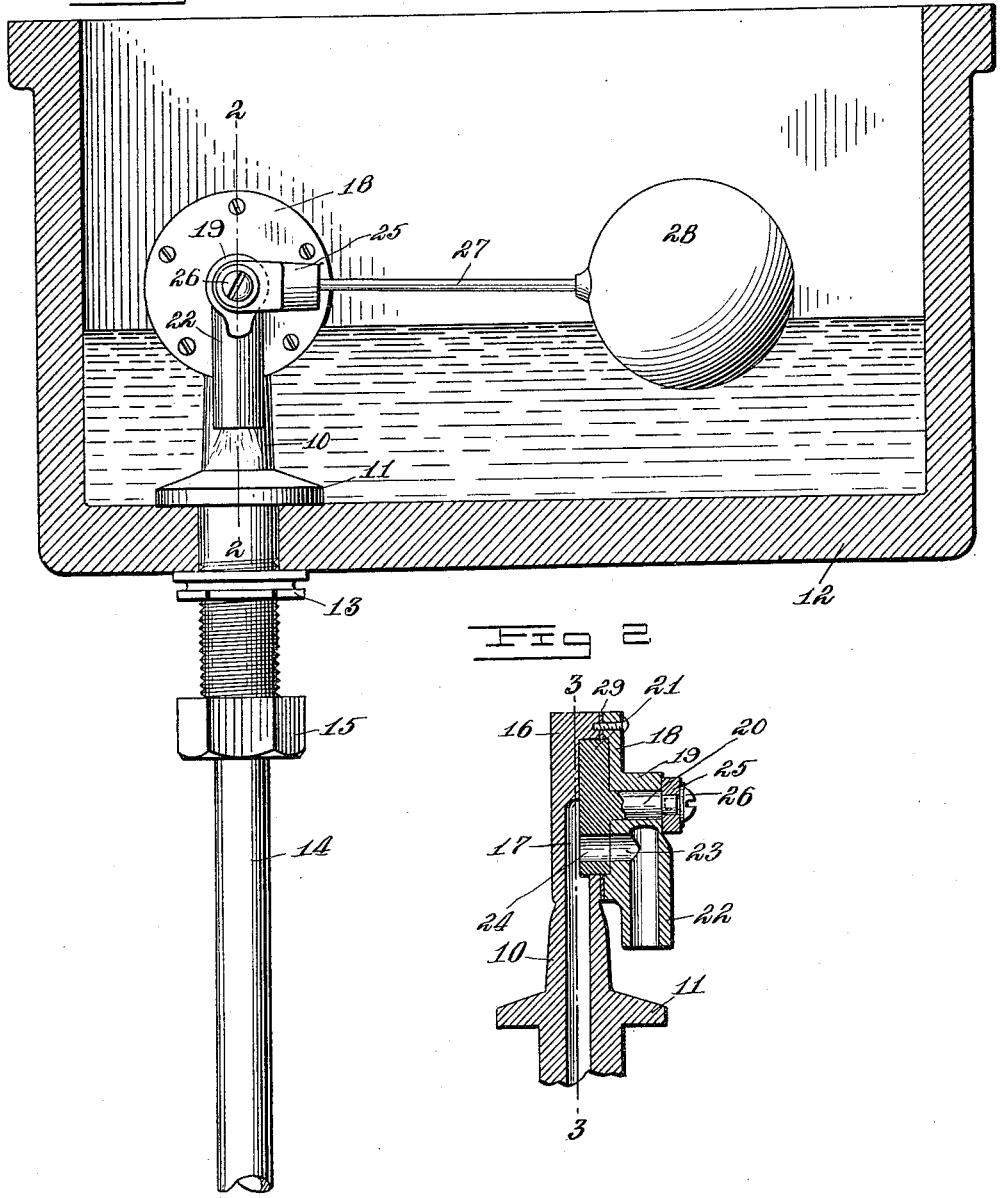

1,140,619.

Patented May 25, 1915.
2 SHEETS—SHEET 2.

Inventor
Gottfried Schmidt

Witnesses
H. A. Robinette
J. T. Mawhinney

By
Attorneys

UNITED STATES PATENT OFFICE.

GOTTFRIED SCHMIDT, OF HAZLETON, PENNSYLVANIA, ASSIGNOR OF ONE-HALF TO R. B. BARBER, OF HAZLETON, PENNSYLVANIA.

VALVE.

1,140,619.  Specification of Letters Patent.  Patented May 25, 1915.

Application filed December 19, 1913. Serial No. 807,626.

*To all whom it may concern:*

Be it known that I, GOTTFRIED SCHMIDT, a citizen of the United States, residing at Hazleton, in the county of Luzerne and State of Pennsylvania, have invented new and useful Improvements in Valves, of which the following is a specification.

This invention relates to an improvement in valves, having particular reference to float controlled inlet valves for flushing tanks, and the like.

The objects of this invention are: to provide a positively actuated valve requiring no springs which rust and become weakened in use, and require no levers which wear in time and effect a lost motion between the float and the valve; to provide a valve requiring no packing which leaks and has to be tightened or renewed; to provide a valve which is adapted for ready attachment to the riser or supply pipe connected to the bottom of the tank; and to provide a valve which is very simple in construction, made up of relatively few parts and which may be economically produced.

In the accompanying drawings there is shown the present preferred embodiment of this invention; the same being disclosed, for the purposes of illustration, in connection with a flushing tank, and wherein—

Figure 3:
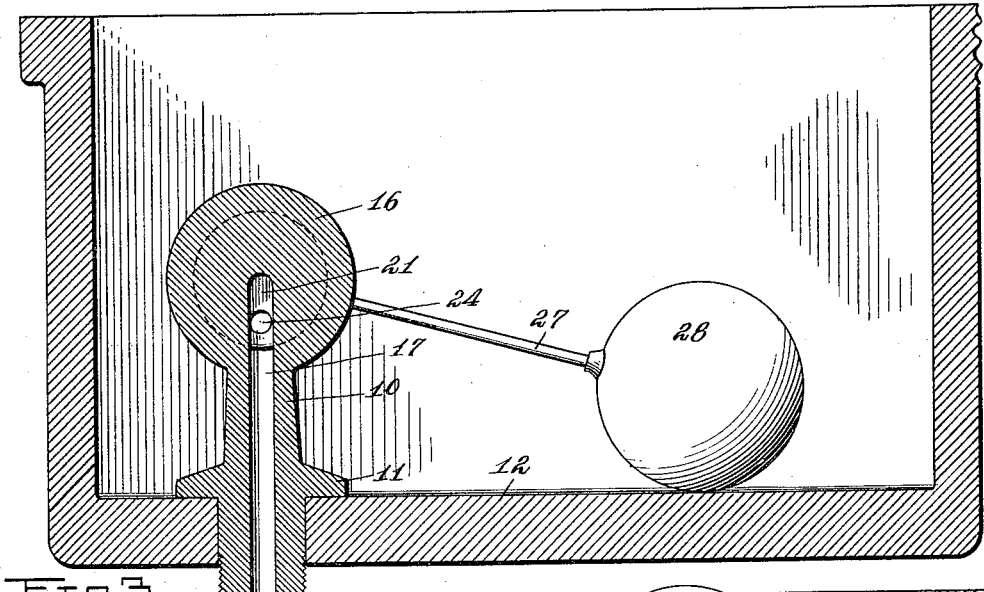
Figure 4:
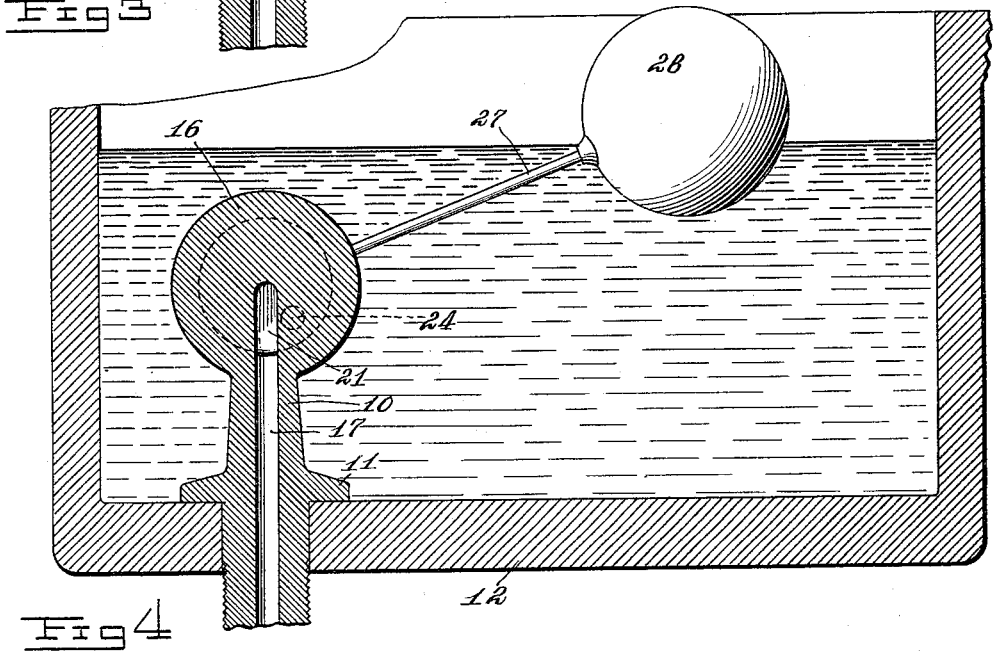

Figure 1 is a vertical section through a flushing tank, showing in side elevation the improved valve and the parts connected thereto; Fig. 2 is a vertical section taken on the line 2—2 of Fig. 1 and Figs. 3 and 4 are sections taken on the line 3—3 of Fig. 2, showing the valve in open and closed positions respectively.

Referring to these drawings, 10 designates a pipe riser provided near its lower end with a base flange 11 adapted for seating in the bottom of a tank 12, the shank or lower extremity of the riser projecting down through an opening in the tank and being externally screw-threaded for the reception of a lock nut 13. The nut 13 is adapted to be screwed up against the underside of the tank and bind the riser in position. The usual supply pipe 14 is connected to the lower end of the riser 10 by a coupling nut 15.

The upper end of the pipe riser 10 is provided with a preferably integral head 16 of cylindrical flat form, as shown in the drawings, although any shape may be given to the head. This head 16 has a seat formed in one side to receive and furnish a bearing for the valve disk, presently to be described, and extending inwardly into said seat is a recess 17; said recess being preferably, as shown, in line with or a continuation of the inlet passage through the pipe or riser 10. This gives both economy of material, since I can make the head 16 relatively thin, and economy in machine work, for in boring the inlet passage through the riser 10 it may be driven through into the seat and the communicating recess 17 formed. A cap 18 is secured against the open side of the head 16 by screws, or the like, and is provided in its inner face with a shallow seat corresponding to the seat in the head 16. The cap 18 is provided with a hub 19 which forms a bearing for a shaft 20 carrying upon its inner end a disk valve 21 rotatably mounted between the head 16 and the cap 18, and takes a firm bearing in the seat formed in the head 16, which seat, as will be seen from Fig. 2, is of sufficient depth to receive substantially the entire thickness of the valve disk 21. The cap 18 is further provided, preferably at its lower side, with a depending outlet nozzle or spout 22 opening at its upper end into an aperture 23 extending through the cap 18 and communicating with the recess therein. The recess or inlet port 17 in the head 16 is arranged directly opposite to the aperture or outlet port 23 in the cap 18, and the disk 21 is disposed between these two ports to cut off communication between the same. The disk 21 is provided near one edge with a through port or opening 24 adapted to register with the inlet and outlet ports 17 and 23 when the disk is turned into an open position.

The disk 21 is held in the cap 18 by a stem socket 25 having preferably an angular opening in its inner end engaging over a correspondingly formed portion of the shaft 20, the socket 25 being held to the shaft 20 by a screw 26, or the like. The socket 25 carries a radially extending stem 27 on the outer end of which is mounted a ball float 28 in the usual manner.

In operation, the socket 25 is so adjusted upon the shaft 20 that when the tank 12 is empty and the float 28 is in lowered position, as shown in Fig. 3 of the drawings, the disk 21 is so turned that the through port 24 therein registers with the inlet and outlet ports 17 and 23. This position of the valve parts admits the flow of water through the riser 10 into the head 16, through the disk 21, and through the cap 18 and its spout 22. As the water rises in the tank the float 28 is raised and effects the turning of the disk 21 and the gradual movement of the port 24 out of line with the inlet and outlet ports. When the tank is full, as shown in Fig. 4 of the drawings, the through port 24 is carried past the inlet and outlet ports and consequently the flow of water through the valve is cut off. Since the disk valve 21 fits snugly in the recesses of the head and cap, as shown in Fig. 2, packing is unnecessary and the disk may be made of such material that it will wear only after long use and such wear may be taken up by tightening the cap 18 upon the head 16. It is preferred to place a washer or packing 29 between the cap and head so as to seal the joint between the two. There of course is no wear upon this packing since the only movable part of the valve is the disk 21 and this disk bears against the inner walls of the recesses in the head and cap.

What is claimed is.

1. A valve comprising a riser having a coaxial passage therein, and having a recess in one side of the upper end thereof intersecting the upper end of the coaxial passage whereby to establish communication between said coaxial passage and the recess, a disk valve seated in the recess having a through port in one side thereof, a cap on the riser inclosing the disk in the recess and having an outlet opening opposite to the upper end of said coaxial passage, and means connected to said disk for turning the same whereby to register the port therethrough with said coaxial passage and outlet opening.

2. A valve comprising a riser having a coaxial passage therein extending throughout substantially the entire length of the riser and having a circular recess in one side of the upper end thereof, the inner wall of said recess being interrupted by the upper end of said coaxial passage whereby to provide an inlet port in coaxial alinement with the riser opening into said recess, a disk seated in said recess to close said inlet, a cap secured to the side of the riser over said disk to house the same in said recess and having an outlet opening in registry with said inlet opening, said disk having a through port in one side thereof, and means for turning said disk whereby to register said port with said inlet and outlet openings.

3. A valve comprising a riser having a coaxial passage therein and having a recess in one side of the upper end thereof intersecting the upper end of the coaxial passage whereby to establish communication between the coaxial passage and the recess, a disk valve seated in said recess and having a through port in one side thereof, a disk retaining cap secured to the upper end of the riser and provided with a central bearing, and an outlet port to be engaged by the port in said disk, and a disk-operating shaft extending outwardly through said cap-bearing.

In testimony whereof I have hereunto set my hand in presence of two subscribing witnesses.

GOTTFRIED SCHMIDT.

Witnesses:
 ROBERT B. BARBER,
 KATE GLOVER HEIDENREICH.

Copies of this patent may be obtained for five cents each, by addressing the "Commissioner of Patents, Washington, D. C."